US008924189B2

(12) United States Patent
Anderson et al.

(10) Patent No.: US 8,924,189 B2
(45) Date of Patent: Dec. 30, 2014

(54) TEMPLATE-BASED APPROACH FOR WORKLOAD GENERATION

(75) Inventors: Kay S. Anderson, Washington, DC (US); Eric P. Bouillet, Jersey City, NJ (US); Parijat Dube, Hicksville, NY (US); Zhen Liu, Tarrytown, NY (US); Dimitrios Pendarakis, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 1613 days.

(21) Appl. No.: 12/128,959

(22) Filed: May 29, 2008

(65) Prior Publication Data

US 2009/0327492 A1   Dec. 31, 2009

Related U.S. Application Data

(63) Continuation of application No. 11/327,071, filed on Jan. 6, 2006, now abandoned.

(51) Int. Cl.
| | | |
|---|---|---|
| G06F 11/34 | (2006.01) | |
| G06G 7/48 | (2006.01) | |
| G06F 15/173 | (2006.01) | |
| G06Q 10/06 | (2012.01) | |
| G06Q 10/10 | (2012.01) | |

(52) U.S. Cl.
CPC ........... *G06Q 10/06* (2013.01); *G06F 11/3414* (2013.01); *G06Q 10/10* (2013.01)
USPC ............. 703/4; 709/224; 709/226; 370/230.1

(58) Field of Classification Search
CPC .................................................. G06F 11/3414
USPC .......................................................... 703/4
See application file for complete search history.

(56) References Cited

U.S. PATENT DOCUMENTS

| 5,440,719 | A | 8/1995 | Hanes et al. |
|---|---|---|---|
| 5,809,282 | A | 9/1998 | Cooper |
| 6,134,514 | A | 10/2000 | Liu et al. |
| 6,295,518 | B1 | 9/2001 | McLain et al. |
| 6,393,386 | B1 | 5/2002 | Zager et al. |
| 6,549,882 | B1 | 4/2003 | Chen et al. |
| 6,845,352 | B1 | 1/2005 | Wang |
| 6,996,517 | B1 * | 2/2006 | Papaefstathiou ................ 703/22 |
| 7,039,559 | B2 | 5/2006 | Froehlich et al. |
| 7,356,770 | B1 * | 4/2008 | Jackson ........................ 715/736 |
| 2004/0181370 | A1 | 9/2004 | Froehlich et al. |
| 2004/0240387 | A1 | 12/2004 | Nuzman et al. |
| 2005/0149908 | A1 | 7/2005 | Klianev |
| 2007/0011052 | A1 * | 1/2007 | Liu et al. ......................... 705/20 |
| 2007/0162602 | A1 * | 7/2007 | Anderson et al. ............. 709/226 |
| 2008/0270595 | A1 * | 10/2008 | Rolia et al. .................... 709/224 |
| 2009/0313631 | A1 * | 12/2009 | De Marzo et al. ............ 718/103 |
| 2010/0287535 | A1 * | 11/2010 | Kim et al. ..................... 717/127 |
| 2013/0054289 | A1 * | 2/2013 | SenGupta et al. .......... 705/7.13 |

OTHER PUBLICATIONS

"OSI model" Definition from Newton's Telecom Dictionary 2004 ISBN 1-57820-309-0, p. 603-604.*
Joel Sommers et al., "Harpoon: A Flow-Level Traffic Generator for Router and Network Tests", SIGMETRICS/Performance '04 Jun. 12-16, 2004, pp. 392-393.
Paul Barford et al., "Generating Representative Web Workloads for Network and Server Performance Evaluation", Joint International Conference on Measurement and Modeling of Computer Systems Archive, Proceedings of the 1998 ACM SIGMETRICS, pp. 151-160, 1998, ISBN: 0-89791-982-3.
Kay S. Anderson et al., "Sword: Scalable and Flexible Workload Generator for Distributed Data Processing Systems", IEEE Proceedings of the 2006 Winter Simulation Conference, Dec. 3-6, 2006, pp. 2109-2116, Digital Object Identifier 10.1109/WSC.2006.323010.
Eveline Veloso et al., "A Hierarchical Characterization of a Live Streaming Media Workload", IEEE/ACM Transactions on Networking, vol. 14, No. 1, Feb. 2006, pp. 133-146.

* cited by examiner

*Primary Examiner* — Akash Saxena
(74) *Attorney, Agent, or Firm* — F. Chau & Associates, LLC

(57) ABSTRACT

A system and method for workload generation include a processor for identifying a workload model by determining each of a hierarchy for workload generation, time scales for workload generation, and states and transitions at each of the time scales, and defining a parameter by determining each of fields for user specific attributes, application specific attributes, network specific attributes, content specific attributes, and a probability distribution function for each of the attributes; a user level template unit corresponding to a relatively slow time scale in signal communication with the processor; an application level template corresponding to a relatively faster time scale in signal communication with the processor; a stream level template corresponding to a relatively fastest time scale in signal communication with the processor; and a communications adapter in signal communication with the processor for defining a workload generating unit responsive to the template units.

20 Claims, 4 Drawing Sheets

TEMPLATE-BASED APPROACH FOR WORKLOAD GENERATION

CROSS-REFERENCE TO RELATED APPLICATION

This is a continuation application of U.S. application Ser. No. 11/327,071, filed on Jan. 6, 2006 now abandoned, and entitled "A TEMPLATE-BASED APPROACH FOR WORKLOAD GENERATION", which is incorporated by reference herein in its entirety.

GOVERNMENT LICENSE RIGHTS

This invention was made with Government support under Contract No. H98230-04-3-0001 awarded by the U.S. Department of Defense. The Government has certain rights in this invention.

BACKGROUND

Workload generation is employed for performance characterization, testing and benchmarking of computer systems dealing with processing, forwarding, storing and/or analysis of network traffic. Workload generation typically aims to simulate or emulate traffic generated by different types of applications, protocols and activities. For example, the activities might include email, chat, web browsing and traffic from sensor networks. The sensor networks might include video surveillance sensors, temperature monitoring sensors, and the like. Different approaches have been used for generating the traffic, such as model driven simulations and client-server architectures.

Examples of currently available traffic generation tools include commercial products such as LoadRunner, Netpressure, Http-Load, and MegaSIP; and academic prototypes such as SURGE, Wagon, Httperf, Harpoon, NetProbe, D-ITG, MGEN, and LARIAT.

The existing workload generation approaches focus primarily on matching predetermined volumetric and timing properties, and ignore statistical properties at the content level, such as content and contextual semantics. Most of the existing approaches for traffic generation are application specific or lack scalability and/or modularity. The traffic generated by these approaches is not suitable for testing and benchmarking systems that analyze data content and make intelligent decisions based on the content. The majority of these tools are not content based or generate only a limited level of content and contextual richness.

SUMMARY

These and other drawbacks and disadvantages of the prior art are addressed by a template-based approach for workload generation.

An exemplary system for workload generation includes a processor for identifying a workload model by determining each of a hierarchy for workload generation, time scales for workload generation, and states and transitions at each of the time scales, and defining a parameter by determining each of fields for user specific attributes, application specific attributes, network specific attributes, content specific attributes, and a probability distribution function (PDF) for each of the attributes; a user level template unit corresponding to a relatively slow time scale in signal communication with the processor; an application level template corresponding to a relatively faster time scale in signal communication with the processor; a stream level template corresponding to a relatively fastest time scale in signal communication with the processor; and a communications adapter in signal communication with the processor for defining a workload generating unit (WGU) responsive to the template units.

A corresponding exemplary method for workload generation includes identifying a workload model by determining each of a hierarchy for workload generation, time scales for workload generation, and states and transitions at each of the time scales; defining a parameter by determining each of fields for user specific attributes, application specific attributes, network specific attributes, content specific attributes, and a probability distribution function (PDF) for each of the attributes; constructing a template for workload generation wherein the template is a user level template corresponding to a relatively slow time scale, an application level template corresponding to a relatively faster time scale or a stream level template corresponding to a relatively fastest time scale; and defining a workload generating unit (WGU) responsive to the template.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a template-based approach for workload generation in accordance with the following exemplary figures, in which.

DETAILED DESCRIPTION OF EXEMPLARY EMBODIMENTS

The present disclosure provides a template-based approach for workload generation. An exemplary embodiment lays a framework for generating scalable, content and contextually rich traffic in accordance with the template-based approach.

In exemplary embodiments, a template is a common pattern characterizing the traffic to be generated for different layers, different protocols, different users or different application domains. Templates capture the most pertinent and repetitive patterns of traffic and can be combined in a layered or recursive manner to define complex traffic generation models. In addition, templates contain fields that allow the specification of different application, protocol and network specific attributes of the traffic.

The different attributes are parametric and are treated as variables or random variables. By specifying different values or probability distributions for these parameters, the behavior of a wide population of users, applications and network conditions can be captured. Templates can specify underlying distributions and other attributes that define the pattern and behavior of the traffic generating units where a single unit can be used to generate either a large or a small class of communicants. This approach has the advantage that it gives complete control to what is generated, including simulating protocols that are not yet well defined such as sensor networks, network impairments, and the like. Further templates allow simplified construction of models without recreating full protocol models.

Templates are then used to define Workload Generating Units (WGU). Multiple templates can be used to define a single WGU when different templates specify different components of a WGU behavior, or a single template can be used to construct many WGUs with all of the WGUs having the same behavior as specified by the template. In addition, a single WGU can be used to generate traffic for either a large or a small class of communicants.

Figure 1:
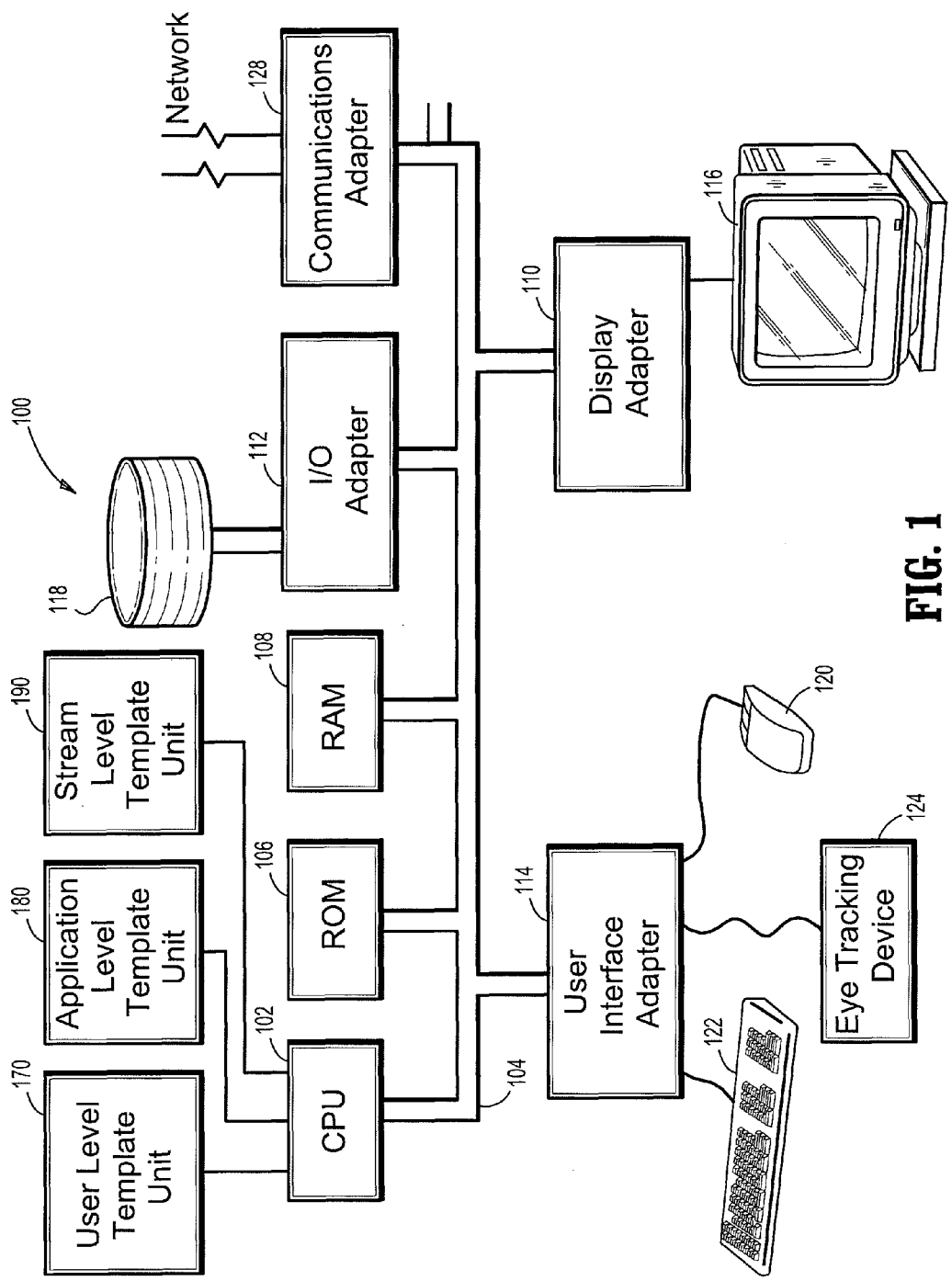
FIG. 1 shows a schematic diagram of a system implementing a template-based approach for workload generation in accordance with an illustrative embodiment of the present disclosure.

As shown in FIG. 1, a system implementing a template-based approach for workload generation, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114 and a communications adapter 128 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114.

A user level template unit 170, an application level template unit 180 and a stream level template unit 190 are also included in the system 100 and in signal communication with the CPU 102 and the system bus 104. While the user level template unit 170, application level template unit 180 and stream level template unit 190 are illustrated as coupled to the at least one processor or CPU 102, these components are preferably embodied in computer program code stored in at least one of the memories 106, 108 and 118, wherein the computer program code is executed by the CPU 102.

Figure 2:
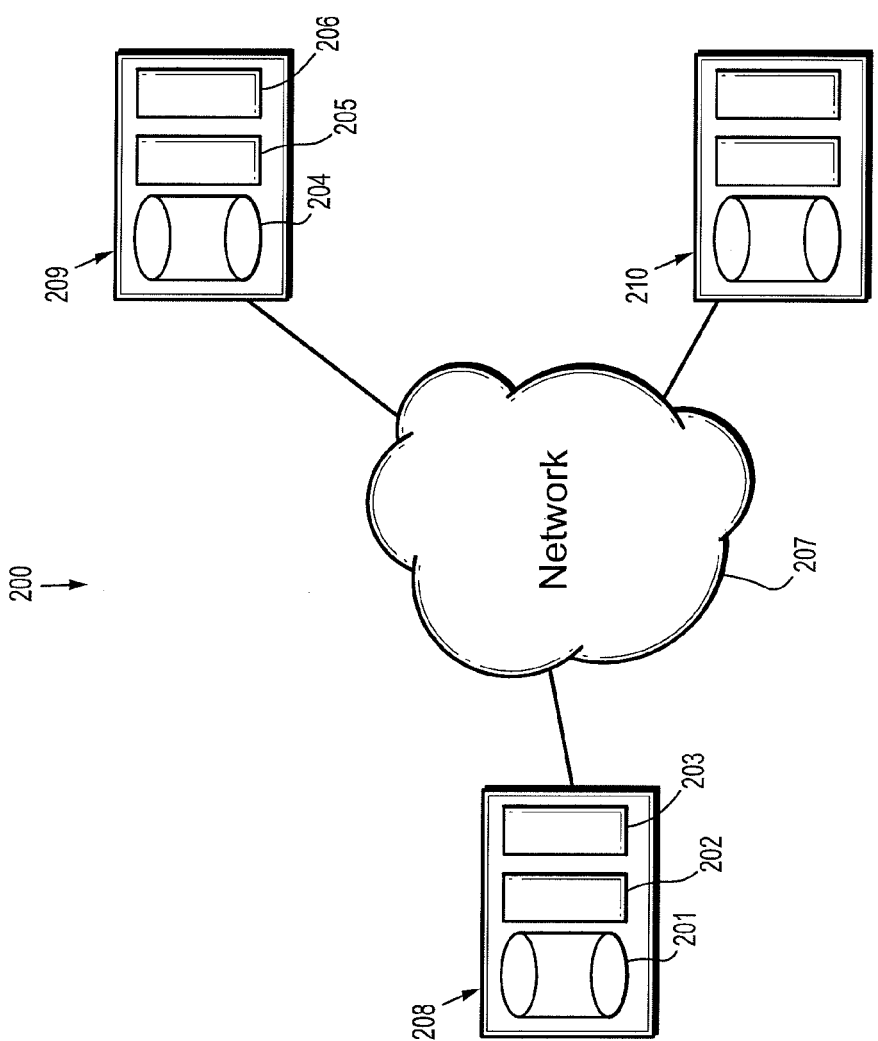
FIG. 2 shows a schematic diagram of a network supporting a template-based approach for workload generation in accordance with an illustrative embodiment of the present disclosure.

Turning to FIG. 2, an exemplary network embodiment is indicated generally by the reference numeral 200. The network 200 may be a part of a bigger application system, such as when connected in signal communication with the communications adapter of FIG. 1. The network 200 includes two remote servers 209 and 210 connected to client machines performing web requests, and also connected to a local server 208 where a main database and web site are hosted via a network connection 207. The local server 208 includes a database 201, an application server 202 and a web server 203.

The remote servers 209 and 210 each include a remote application server 205 and a remote web server 206. The remote server 209 has a remote data cache 204. Requests for dynamic content are received by the remote server and handled by application components hosted inside the remote application server 205. These components issue database queries, which are intercepted by the remote data cache 204 and handled from the remote database, if possible. If the query can not be handled by the remote database, the remote data cache 204 forwards the request to the local database 201 and retrieves the results from there.

Figure 3:
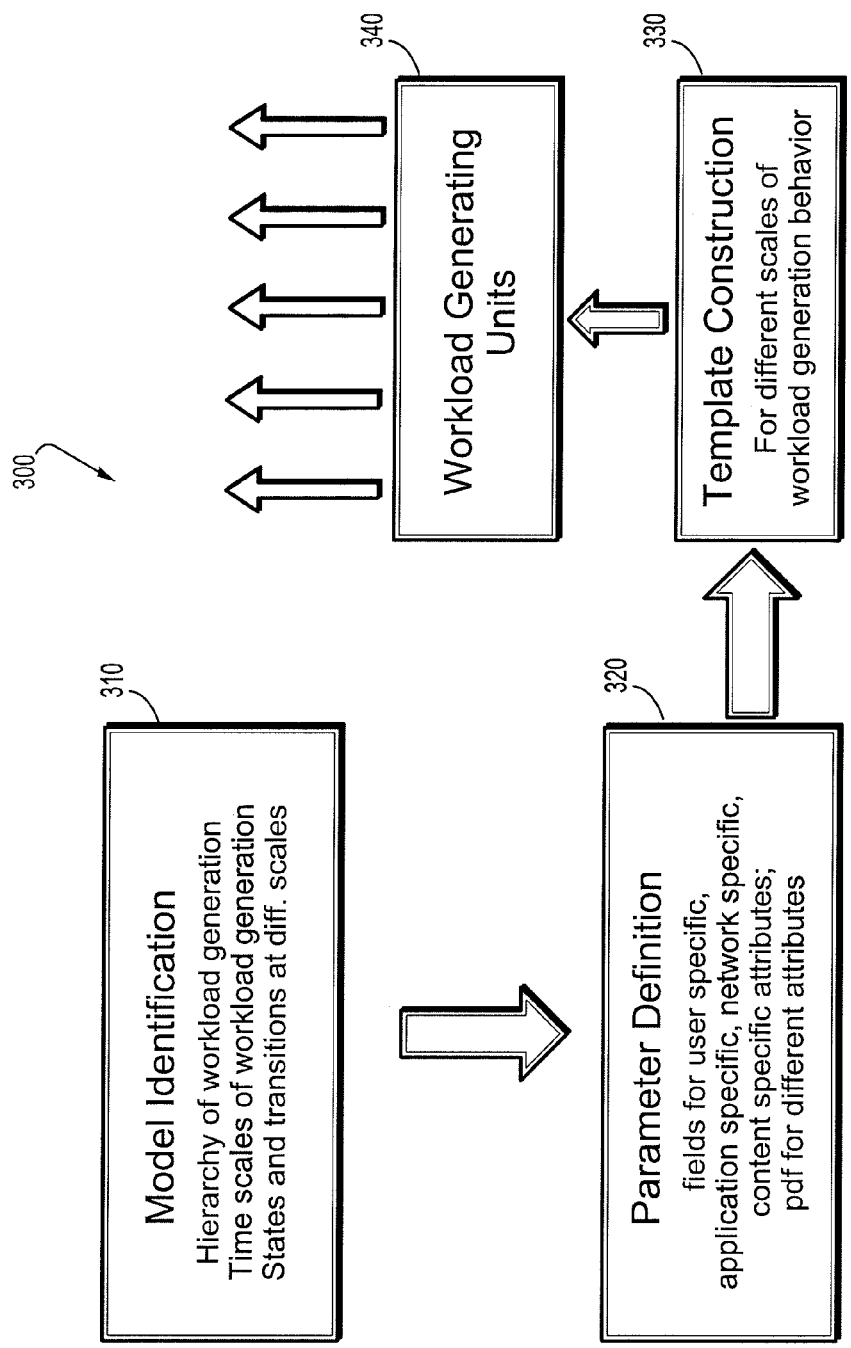
FIG. 3 shows a flow diagram of a method for a template-based approach for workload generation in accordance with an illustrative embodiment of the present disclosure.

Turning now to FIG. 3, a method for a template-based approach for workload generation is indicated generally by the reference numeral 300. The method 300 includes a function block 310 for model identification, which determines the hierarchy of workload generation, the time scales of workload generation, as well as the states and transitions at different scales. The function block 310 passes control to a function block 320 for parameter definition.

The function block 320 determines the fields for user specific, application specific, network specific, and content specific attributes, as well as a probability distribution function (PDF) for different attributes. The function block 320, in turn, passes control to a function block 330 for template construction, which constructs templates for different scales of workload behavior. The function block 330 passes control to a function block 340, which provides workload generating units.

Figure 4:
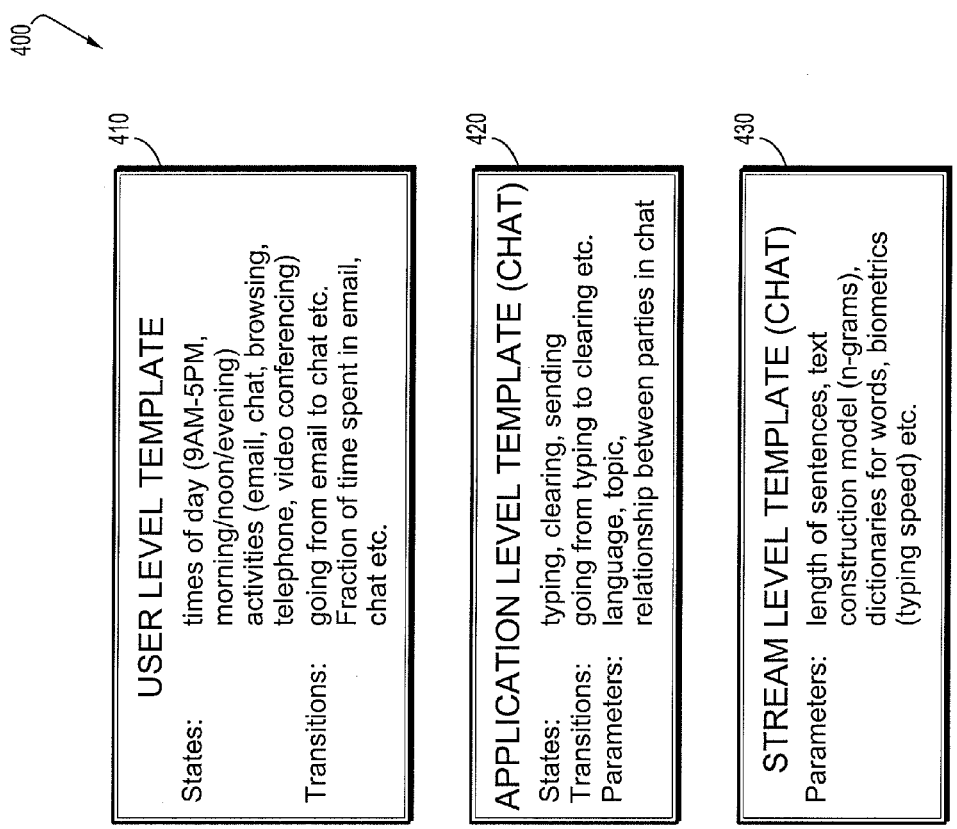
FIG. 4 shows a schematic diagram of templates for a template-based approach for workload generation in accordance with an illustrative embodiment of the present disclosure.

As shown in FIG. 4, a set of templates for a template-based approach for workload generation is indicated generally by the reference numeral 400. The set includes a user level template 410, an application level template 420, and a stream level template 430. The user level template 410 provides states and transitions, the states including times of day such as 9 AM-5 PM, morning/noon/evening, and the like, activities such as email, chat, browsing, telephone, video conferencing, and the like; and the transitions including going from email to chat and the like, and the fraction of time spent in email, chat and the like.

The application level template 420 is for any given application, such as chat, for example. Here, the application level template for chat includes states, transitions and parameters applicable to chat. Thus, the relevant states include typing, clearing, and sending. The relevant transitions include going from typing to clearing, and the like. The relevant parameters include language, topic, and the relationship between the parties to the chat, for example.

The stream level template 430 is for any given application, such as chat, for example. Here, the stream level template for chat includes parameters applicable to chat. Thus, the relevant parameters are the length of the sentences, a text construction model using n-grams, dictionaries for words, biometrics such as typing speed, and the like.

In operation, the workload generation behavior is viewed as the aggregate of correlated behaviors at different time scales. For example, to generate templates for workload generated on the internet due to human activities such as chat, web browsing, VoIP and the like, different time scales of traffic generation are identified and the human behavior and the resulting traffic are modeled in a hierarchical manner.

Here, the user level behavioral model is characterized by a slower time scale on the order of minutes to hours; the usage frequencies of the various applications; the fraction of time spent in different applications during the day; the types of applications, such as emails, chat, http and the like; and the number and identification of associates. The application level behavioral model is characterized by a faster time scale on the order of seconds to minutes; dynamics of activities within a session; possible states within an application; and OSI Layer 7 level protocols such as login, handshake, and session closing. The data stream level model is characterized by a very fast time scale on the order of microseconds; content based such as topic, language, and volumetrics; the Codec such as GSM, MPEG, MP3; and OSI Layer-2-6 protocols.

Templates are created for these three different time-scales of traffic. The template for the slow-time scale session-level behavioral model has fields corresponding to different times of day; different types of applications such as web-browsing, email, and chat, that an individual is involved in; associates with whom an individual interacts; and transitions between different places. The parameters are places, transitions, fraction of time spent before firing a transition and other attributes specific to the types of the places and the transitions. The template at this level will be used to schedule traffic generation units at the fast-time scale. At this level, the specificities such as protocol level of the particular applications are relatively unimportant.

The template for the fast-time scale application-level behavioral model has fields corresponding to different possible states an individual is in a particular application, such as typing, sending, clearing in case of chat, and transitions between these places. As before, the parameters are places, transitions, fraction of time spent before firing a transition and other attributes specific to the type of the place or the transition. The templates at this level will be used to generate data streams that shall constitute the traffic. The streams are generated in compliance with the specific protocol on which the application is running.

The data generation templates implement the logic for generating the content according to high-level control parameters passed on by the application level behavioral model. For example, in chat the parameters can be topic, spoken language, dictionaries, noise levels, level of realism, and source if pre-recorded. By specifying the probability distribution functions (PDFs) and dictionaries, the user can control the length of the sentences, stochastic rules for concatenating the words, the language and the various topics during the chat, and biometric characteristics such as typing speed. The content generated by using the templates at this level will be packaged into the appropriate stack of Protocol Data Units (PDU) before writing it to the respective output streams. In addition, by emulating the protocol stack down to the IP layer, theses templates can provide the user with the additional ability to control network related attributes such as IP addresses of the parties involved in the chat, TCP parameters such as port numbers, window sequence numbers, ACK, and the like.

Referring back to FIG. 3, the method 300 that provides a framework for template-based workload generation highlights the major building blocks of embodiments of the present disclosure.

Recalling FIG. 4, the exemplary templates 410, 420 and 430 are relevant to a workload generation pattern in a corporate environment, where different templates are shown for different scales. Thus, this exemplary embodiment identifies different time scales of workload generation and defines templates at these time scales for workload generation in a generic corporate scenario with 9 AM-5 PM working hours. Here, the templates work for defining workload generation patterns at different time scales in a corporate environment.

The template-based approach provides the foundation for building workload generators with important features. The feature of controllability provides for easy orchestration of volumetric and contextual statistics such as protocol mix of generated traffic, time ranges of causal traffic, virtual and network topology attributes, traffic loss and delay characteristics, data source perturbation, tunable levels of accuracy in the data offered to the tested system, and ability to infuse cross-stream correlations. The feature of scalability is achieved since all the traffic is artificially generated. Thus, the template-based approach is much more scalable and is not limited by the storage bottlenecks as in the case of client-server approaches for traffic generation.

The features of reliability and robustness are attained. Unlike client-server approaches, the template-based approach is less dependent on external parameters such as intermittent resource congestions and server availability. The features of modularity and extensibility are attained because the templates for different applications can be built independently using application specific statistical properties. These can be used, in turn, to define or build on the fly independent agents generating traffic for the particular application. The right volumetric mix of traffic from different applications can be easily generated by invoking the right number of these agents, and the right contextual mix can be generated by tuning the contents of the data units generated by these agents.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although exemplary embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. For example, the exemplary method for determining how many attributes should be determined may be augmented or replaced with more sophisticated attribute determination techniques. For another example, the template-based framework may be incorporated into advanced network support systems that are responsive to multi-modal data, such as numeric data, text data, voice data and video data. All such changes and modifications are intended to be included within the scope of the present disclosure as set forth in the appended claims.

What is claimed is:

1. A method for workload generation comprising:
   identifying a workload model by determining each of a hierarchy for workload generation, a plurality of time scales for workload generation, and states and transitions at each of the plurality of time scales;
   determining at least one of a user specific attribute, an application specific attribute, a network specific attribute, and a content specific attribute, and a probability distribution function (PDF) for each determined attribute;

constructing at least one template for workload generation using the determined attribute wherein the at least one template is a user level template corresponding to a relatively slow time scale of the plurality of time scales if the determined attribute is the user specific attribute, an application level template corresponding to a relatively faster time scale of the plurality of time scales if the determined attribute is the application specific attribute or a stream level template corresponding to a relatively fastest time scale of the plurality of time scales if the determined attribute is the content specific attribute; and defining at least one workload generating unit (WGU) responsive to the at least one template.

2. A method as defined in claim 1 wherein the at least one template defines states for workload generation.

3. A method as defined in claim 1 wherein the at least one template defines transitions for workload generation.

4. A method as defined in claim 1 wherein the at least one template defines parameters for workload generation.

5. A method as defined in claim 1 wherein a plurality of templates defines the at least one WGU.

6. A method as defined in claim 1 wherein the at least one template defines a plurality of WGUs.

7. A method as defined in claim 1 wherein one WGU of the at least one WGU is used to generate traffic for different classes of communicants.

8. A system for workload generation comprising:
a processor for identifying a workload model by determining each of a hierarchy for workload generation, a plurality of time scales for workload generation, and states and transitions at each of the plurality of time scales, and determining a user specific attribute, an application specific attribute, a network specific attribute, and a content specific attribute, and a probability distribution function (PDF) for each determined attribute;

a user level template unit corresponding to a relatively slow time scale of the plurality of time scales in signal communication with the processor, the user level template taking the user specific attribute as a variable;

an application level template corresponding to a relatively faster time scale of the plurality of time scales in signal communication with the processor, the application level template taking the application specific attribute as a variable;

a stream level template corresponding to a relatively fastest time scale of the plurality of time scales in signal communication with the processor, the stream level template taking the content specific attribute as a variable; and a communications adapter in signal communication with the processor for defining at least one workload generating unit (WGU) responsive to at least one of the template units.

9. A system as defined in claim 8 wherein at least one of the template units defines states for workload generation.

10. A system as defined in claim 8 wherein at least one of the template units defines transitions for workload generation.

11. A system as defined in claim 8 wherein at least one of the template units defines parameters for workload generation.

12. A system as defined in claim 8 wherein a plurality of template units defines the at least one WGU.

13. A system as defined in claim 8 wherein at least one template unit defines a plurality of WGUs.

14. A system as defined in claim 8 wherein the communications adapter uses one WGU of the at least one WGU to generate traffic for different classes of communicants.

15. A program storage device readable by machine, tangibly embodying a program of instructions executable by the machine to perform program steps for workload generation, the program steps comprising:
identifying a workload model by determining each of a hierarchy for workload generation, a plurality of time scales for workload generation, and states and transitions at each of the plurality of time scales;

determining at least one of a user specific attribute, an application specific attribute, a network specific attribute, and a content specific attribute, and a probability distribution function (PDF) for each determined attribute;

constructing at least one template for workload generation using the determined attribute wherein the at least one template is a user level template corresponding to a relatively slow time scale of the plurality of time scales if the determined attribute is the user specific attribute, an application level template corresponding to a relatively faster time scale of the plurality of time scales if the determined attribute is the application specific attribute or a stream level template corresponding to a relatively fastest time scale of the plurality of time scales if the determined attribute is the content specific attribute; and defining at least one workload generating unit (WGU) responsive to the at least one template.

16. A program storage device as defined in claim 15 wherein the at least one template defines states for workload generation.

17. A program storage device as defined in claim 15 wherein the at least one template defines transitions for workload generation.

18. A program storage device as defined in claim 15 wherein the at least one template defines parameters for workload generation.

19. A program storage device as defined in claim 15 wherein a plurality of templates defines the at least one WGU.

20. A program storage device as defined in claim 15 wherein the at least one template defines a plurality of WGUs.

* * * * *